Figure 2:
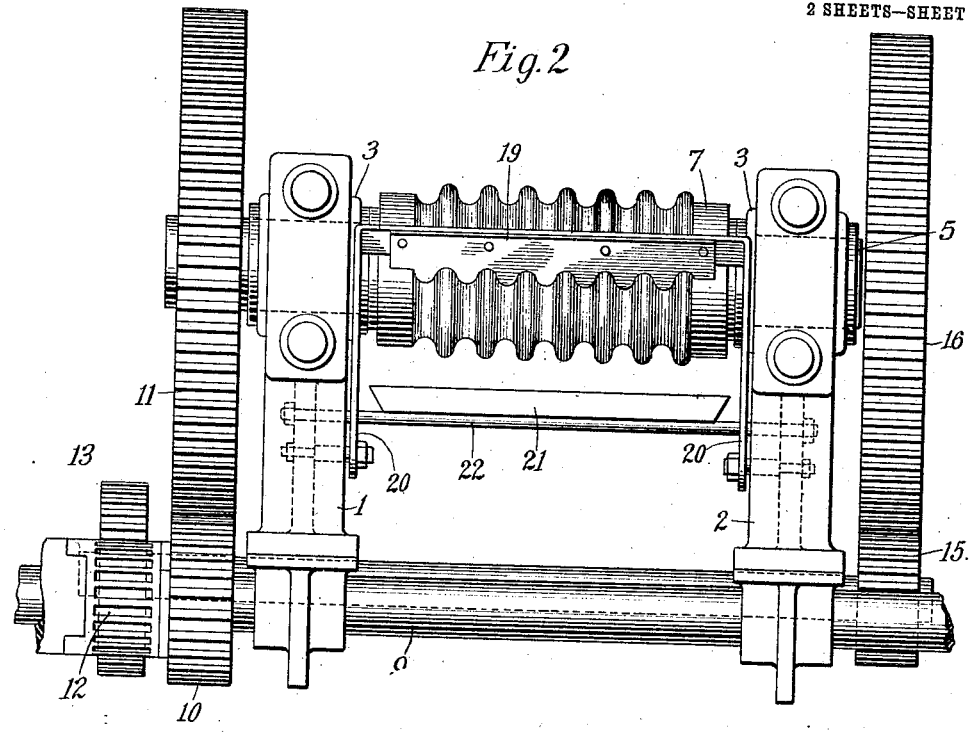

No. 827,936. PATENTED AUG. 7, 1906.
C. F. OBERMAIER.
RUBBER WARMING AND MIXING MILL.
APPLICATION FILED OCT. 27, 1905.

2 SHEETS—SHEET 1.

Witnesses
Raphaël Netter
A. S. Dunham

Carl F. Obermaier, Inventor
By his Attorneys
Kerr, Page & Cooper

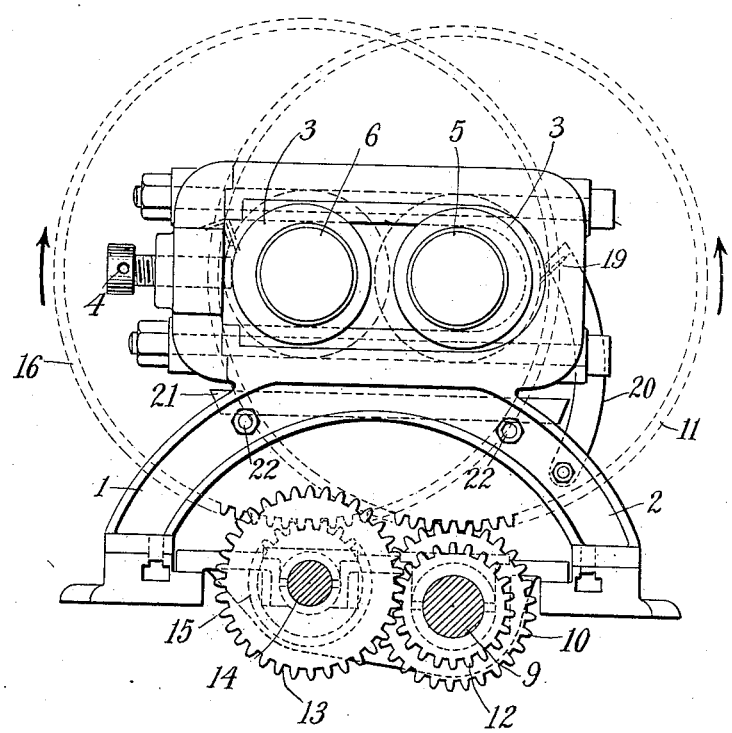

UNITED STATES PATENT OFFICE.

CARL F. OBERMAIER, OF YONKERS, NEW YORK.

RUBBER WARMING AND MIXING MILL.

No. 827,936.

Specification of Letters Patent.

Patented Aug. 7, 1906.

Application filed October 27, 1905. Serial No. 284,601.

*To all whom it may concern:*

Be it known that I, CARL F. OBERMAIER, a citizen of the United States, residing at Yonkers, county of Westchester, and State of New York, have invented certain new and useful Improvements in Rubber Warming and Mixing Mills, of which the following is a specification, reference being had to the drawings accompanying and forming part of the same.

My invention relates to apparatus for kneading or mixing rubber, and has for its object to provide a machine of this kind which shall effect the desired kneading or working in an expeditious manner with a greatly-increased output.

My improvement is directed more particularly to mixing-machines in which the mixing is effected by a pair of coöperating rollers; and the chief feature of my invention consists in the provision of corrugated rollers, preferably with the ridges and grooves running circumferentially. The rolls are arranged so that the ridges on one enter the grooves in the other, and the rubber is introduced between them. One roll being driven faster than the other, the rubber adheres to the former, while the difference of speed produces a pulling or stretching effect, which rapidly reduces the rubber to a uniform consistency. The friction thus caused produces sufficient heat to warm the mass thoroughly. The corrugations on the rolls have the effect of increasing the active surface thereof by as much as fifty per cent., or more, if desired, and at the same time the effect on the rubber due to difference of speed between the rolls is also largely increased. This is due to the fact that the peripheral speed of the rolls as opposed to the angular speed is greater at the summit of a ridge than at the bottom of a groove. Hence the rubber in the grooves is worked at a different speed from that on the ridges, aside from the mere difference of angular speed. Consequently the rubber is subjected to a difference of speed on the more rapidly moving roller itself, and it therefore gets a more energetic kneading than would be the case if smooth rolls were used and dependence therefor placed only on the driving of one faster than the other. In other words, with smooth rollers the pulling or kneading of the batch is substantially uniform along the line of contact, whereas with my corrugated rollers the rubber on the ridges of the more rapidly revolving roller is worked faster than that in the grooves, due to the difference of speed between these different parts of the batch. The result is a more rapid and thorough mixing and kneading than it has been possible to secure with any of the prior machines with which I am familiar.

The preferred embodiment of my invention is illustrated in the annexed drawings, to which reference will now be made for a more detailed explanation.

Figure 1:
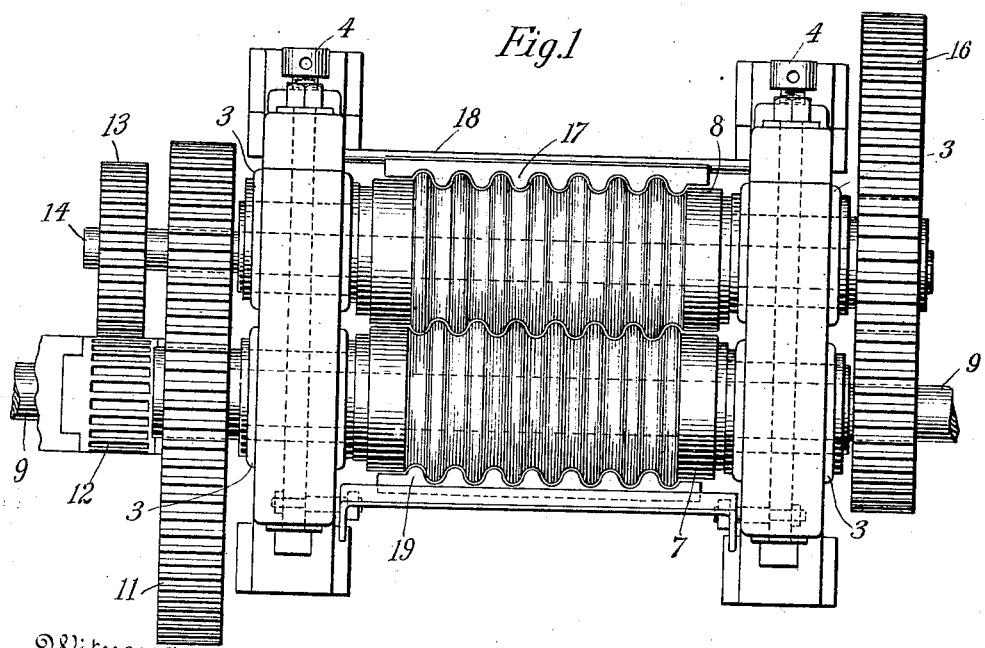

Figure 1 is a top plan view of the machine. Figs. 2 and 3 are side and end elevations, respectively.

1 and 2 designate the end frames of the machine. In the upper parts of the frames are horizontal open spaces to receive the circular bearing-blocks 3. The bearings in these blocks are eccentric, and the blocks are arranged so that the thicker sides are presented outwardly. This is for the reason that the wear on the blocks is practically all in that direction, tending to wear the bearing-openings to an elliptical form. Such wear can go on for a considerable time on the thicker sides of the blocks without reducing them too much at those points. The bearing-blocks are mounted to slide in the frames and are held at the desired distance apart by the screws 4. The roller-shafts 5 6 carry the rollers 7 8. The latter are corrugated circumferentially and mesh with each other, as shown.

Mounted in suitable bearings below the rollers at the bottom of the machine is a power-shaft 9, provided at one end with a pinion 10, meshing with a larger gear-wheel 11 on the front roll-shaft 5. On the same end of the shaft 9 is a smaller pinion 12, engaging a larger pinion 13 on a counter-shaft 14, which at its opposite end carries a smaller pinion 15, meshing with a large gear 16 on the roll-shaft 6. It will therefore be seen that while the roller 7 is driven at comparatively low speed by reason of the difference in size between the gears 10 and 11 the reducing-gears 12, 13, and 15 cause the roller 8 to revolve at a much lower rate.

Arranged longitudinally of the roller 8 is a stationary knife 17 on a bar 18, fixed between the end frames 1 and 2. The knife has a corrugated edge conforming to the corrugations on the roller. On the other side of the machine is a similar knife 19, carried by arms 20, pivoted at their lower ends to the frames 1 and 2, so that the knife may be swung into or out of engagement with the mass of rubber in the roll 5. Both blades are inclined downward, so as to have a scraping effect on the rollers, which revolve in the direction of the arrows seen at the peripheries of the gears 11 and 16 in Fig. 3. Pieces of rubber sometimes adhere to the slower roller and would be carried around with it but for the knife 17, which scrapes them off into the pan 21, supported below the rollers on rods 22. When it is desired to remove the batch adhering to the faster roller, the knife 19 is thrown against the same, and as the roller continues to revolve the mass is scraped off by the knife and is seized by the operator or is allowed to drop into the pan 21.

In using the machine the batch of rubber is deposited between the rollers. As already explained, the corrugations produce a marked pulling, tearing, and kneading effect, bringing the rubber rapidly to the desired degree of homogeneity, while at the same time it is warmed by the heat due to friction.

It will be evident to those skilled in the art that the apparatus herein specifically shown and described may be modified greatly without departure from the proper spirit of my invention as defined by the following claims:

1. In a machine for mixing and kneading rubber, the combination of a pair of coacting rollers, each having corrugations intermeshing with corrugations on the other, and means for rotating one roller faster than the other, as set forth.

2. In a machine for mixing and kneading rubber, the combination of a pair of coacting rollers, each having circumferential corrugations intermeshing with similar corrugations on the other, and means for rotating one roller faster than the other, as set forth.

3. In a machine for mixing and kneading rubber, the combination of a pair of coacting rollers, each having circumferential corrugations intermeshing with similar corrugations on the other, means for rotating one roller faster than the other, a scraping-knife arranged in operative relation to the slower roller, and a movable knife adapted to be swung into and out of engagement with the faster roller, as set forth.

4. In a machine for mixing and kneading rubber, the combination of a pair of coacting rollers, each having circumferential corrugations intermeshing with similar corrugations on the other, means for rotating one roller faster than the other, a knife having a similarly-corrugated edge arranged with its teeth entering the grooves on the slower roller, constituting a scraper to detach pieces of material adhering to the said roller, and a similarly-corrugated knife mounted to be swung into and out of engagement with the faster roller to detach the mass of material therefrom at will, as set forth.

CARL F. OBERMAIER.

Witnesses:
EUGENE A. BREMSER,
F. HERDLING.